J. GULDEN.

Soldering Apparatus.

No. 5,362. Reissued April 22, 1873.

Witnesses:
Fred Hamm
Ferd Kruck

Jacob Gulden
per Wales Brown & Allen
Attorneys

UNITED STATES PATENT OFFICE.

JACOB GULDEN, OF KEY PORT, NEW JERSEY.

IMPROVEMENT IN SOLDERING APPARATUS.

Specification forming part of Letters Patent No. 117,770, dated August 8, 1871; reissue No. 5,362, dated April 22, 1873; application filed January 15, 1873.

*To all whom it may concern:*

Figure 1:
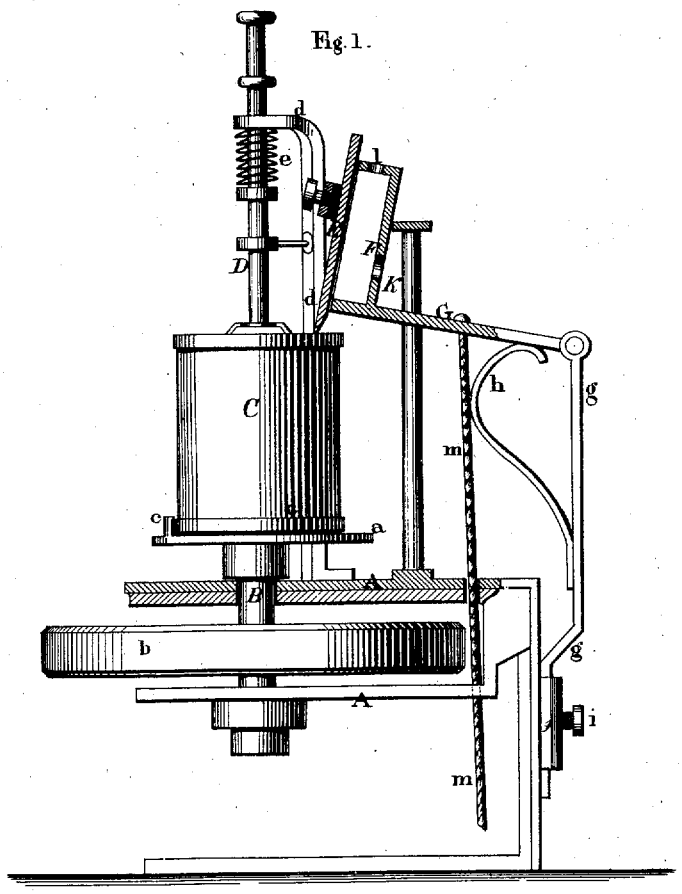
Figure 2:
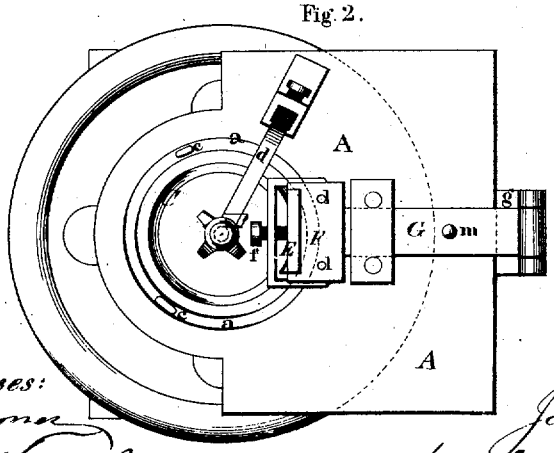

Be it known that I, JACOB GULDEN, of Key Port, in the county of Monmouth and State of New Jersey, have invented an Improved Soldering Apparatus, of which the following is a specification:

Figure 1 represents a side view, partly in section, of my improved soldering apparatus. Fig. 2 is a plan or top view of the same.

Similar letters of reference indicate corresponding parts.

The object of this invention is to produce a compact and simple machine for closing or capping tin cans. My invention consists in a soldering apparatus improved as hereinafter fully described, and subsequently pointed out in the claim.

A in the drawing represents the stationary frame of my new soldering apparatus. In it are the bearings of a vertical shaft, B, which carries at its upper end a disk or platform, *a*, and under the same a hand-wheel, pulley, or handle, *b*, whereby it can be revolved. The can C to be soldered is placed upon the disk *a* and centered thereon by projecting lugs *c c*. A presser-foot, D, sliding in an arm *d* of the frame A is, by a spring, *e*, held down upon the covering-plate or cap of the can C. The can is thus held in place, and is revolved whenever the shaft B is turned, as stated. E is the soldering-iron. It is fastened to a bar, G, which is pivoted to an upright standard, *g*. A spring, *h*, connects with the bar G so as to raise it and hold the soldering-iron clear of the can C. The post or standard *g* is, by preference, secured by a screw, *i*, in a loop or eye, *j*, of the frame A, and can thus be vertically adjusted to fit the iron E to higher or lower cans. The bar G may be made extensible to bring the iron a suitable distance from the center of the can. A gas-pipe is conducted toward the apparatus, and its burner so placed that when the gas is ignited its heat will cause the soldering-iron to become heated.

Whenever, by a cord, *m*, and treadle or otherwise, the bar G is swung down to carry the point of the soldering-iron upon the revolving can, and solder is applied to the latter, the desired process is carried on rapidly and in workmanlike manner.

*Claim.*

The combination of the soldering-iron E with the pivoted bar G, spring *h*, and standard *g*, substantially as described.

JACOB GULDEN.

Witnesses:
A. V. BRIESEN,
FRED. HAYNES.